(12) United States Patent
Crowne et al.

(10) Patent No.: US 10,442,545 B2
(45) Date of Patent: Oct. 15, 2019

(54) LIQUID MEASUREMENT SYSTEM FOR A TANK

(71) Applicant: Simmonds Precision Products, Inc., Vergennes, VT (US)

(72) Inventors: David H. Crowne, Weybridge, VT (US); Charles Jeff Allred, Shelburne, VT (US)

(73) Assignee: Simmonds Precision Products, Inc., Vergennes, VT (US)

( * ) Notice: Subject to any disclaimer, the term of this patent is extended or adjusted under 35 U.S.C. 154(b) by 9 days.

(21) Appl. No.: 15/490,606

(22) Filed: Apr. 18, 2017

(65) Prior Publication Data
US 2018/0299315 A1   Oct. 18, 2018

(51) Int. Cl.
| | |
|---|---|
| *G01F 22/02* | (2006.01) |
| *B64D 37/00* | (2006.01) |
| *B64D 37/04* | (2006.01) |
| *F02C 7/22* | (2006.01) |
| *G01F 22/00* | (2006.01) |
| *G01F 23/14* | (2006.01) |
| *G01F 17/00* | (2006.01) |

(52) U.S. Cl.
CPC ............ *B64D 37/005* (2013.01); *B64D 37/04* (2013.01); *F02C 7/22* (2013.01); *G01F 22/00* (2013.01); *G01F 22/02* (2013.01); *G01F 23/14* (2013.01); *F05D 2270/3015* (2013.01); *G01F 17/00* (2013.01)

(58) Field of Classification Search
CPC .......... G01F 22/02; G01F 23/14; G01F 23/16
See application file for complete search history.

(56) References Cited

U.S. PATENT DOCUMENTS

| | | | |
|---|---|---|---|
| 3,596,510 A | 8/1971 | Paine et al. | |
| 4,553,431 A | 11/1985 | Nicolai | |
| 4,840,064 A | 6/1989 | Fudim | |
| 5,138,559 A * | 8/1992 | Kuehl | G01F 23/0076 340/618 |
| 5,526,683 A * | 6/1996 | Maggio | G01F 17/00 73/149 |
| 6,062,066 A | 5/2000 | Loen | |
| 8,371,533 B2 * | 2/2013 | Tichborne | B64D 37/00 244/135 R |
| 8,757,197 B2 * | 6/2014 | Hirata | G05D 7/0635 137/487.5 |
| 9,909,967 B2 * | 3/2018 | McBrien | G01F 1/00 |

(Continued)

OTHER PUBLICATIONS

Extended European Search Report for EP Application No. 18167819.4, dated Oct. 2, 2018, pp. 9.

*Primary Examiner* — Justin N Olamit
(74) *Attorney, Agent, or Firm* — Kinney & Lange, P.A.

(57) ABSTRACT

A liquid measurement system for determining a quantity of a liquid within a tank includes a pressurized air supply, a valve connected to the pressurized air supply with the valve able to introduce a known mass of air into the tank, a pressure sensor able to measure the change in air pressure within the tank, and a processor operatively connected to the valve and the pressure sensor. The processor is able to determine the volume of the liquid within the tank from the known mass of air introduced into the tank and the change in air pressure within the tank.

11 Claims, 1 Drawing Sheet

(56) References Cited

U.S. PATENT DOCUMENTS

| | | | |
|---|---|---|---|
| 2007/0151350 A1* | 7/2007 | Sheldon | G01F 22/02 73/729.2 |
| 2015/0268073 A1* | 9/2015 | Gaully | B64D 13/00 702/47 |
| 2017/0038238 A1* | 2/2017 | Nguyen | G01F 23/0076 |

* cited by examiner

LIQUID MEASUREMENT SYSTEM FOR A TANK

BACKGROUND

The present disclosure relates to a tank for containing liquid and, in particular, to a measurement system for measuring the quantity of liquid within a tank.

It many liquid storage applications, such as a fuel tank on a vehicle, it is important to know the quantity of the liquid remaining in the storage container. In applications such as a fuel tank on an aircraft, determining the quantity of the liquid within the tank is problematic. In aircraft, the tank may have an irregular shape, contain complex structures (pumps, valves, transfer and vent pipes, etc.) and include baffles that make measurement of the tank's contents difficult. Further, if the tank is filled with fuel, aviation regulations limit electrical energy within the tank to prevent of ignition of the fuel. Due to these constraints, determining the quantity of liquid within a tank can require many sensors (to ensure fuel measurement at all fuel levels and attitudes) that require electrical interfaces to measurement electronics within or near the tank. Designing this array of sensors, associated wiring, and measurement electronics in such a way that it does not present an electrical hazard and does not need to be routinely inspected to ensure safety features are in place is a challenge for the industry.

Conventional methods and systems have generally been considered satisfactory for their intended purpose. However, there is still a need in the art for systems and methods that allow for improved liquid quantity sensing in, for example, flammable environments.

SUMMARY

A liquid measurement system for determining a quantity of a liquid within a tank includes a pressurized air supply, a valve connected to the pressurized air supply with the valve able to introduce a known mass of air into the tank, a pressure sensor able to measure the change in air pressure within the tank, and a processor operatively connected to the valve and the pressure sensor. The processor is able to determine the volume of the liquid within the tank from the known mass of air introduced into the tank and the change in air pressure within the tank.

A method of measuring a liquid in a tank includes introducing a first known mass of air into the tank, measuring a change in air pressure within the tank in response to the introduction of the first known mass of air, and determining the volume of the liquid within the tank depending on the change in air pressure within the tank.

An aircraft includes a fuel tank in a wing of the aircraft, a pressurized air supply, a valve connected to the pressurized air supply with the valve configured to allow a known mass of air into the fuel tank, a vent in the tank configured to allow air to leave the fuel tank, a densitometer configured to measure a density of fuel within the fuel tank, a pressure sensor configured to measure a change in pressure of the air within the fuel tank in response to the addition of the known mass of air, and a processor operatively connected to the valve, the densitometer, and the pressure sensor. The processor is configured to determine a quantity of fuel within the fuel tank from the known mass of air added to the fuel tank, the change in pressure of the air within the fuel tank, and the density of fuel within the fuel tank.

DETAILED DESCRIPTION

A liquid measurement system is disclosed that requires only one pressure sensor and only one densitometer to determine the quantity of liquid within a tank. The pressure sensor and densitometer can be arranged such that no electrical energy is introduced into fuel tank environment. As opposed to other systems that require a large number of sensors and other components, the disclosed liquid measurement system requires very few components, reducing the complexity and weight of the system, which can increase efficiency if the liquid measurement system is located on a vehicle. The components of the liquid measurement system also do not require electrical energy within the fuel tank, which can increase the risk of ignition of fuel within the tank.

While this disclosure will discuss the liquid measurement system with regards to a fuel measurement system in conjunction with a fuel tank on an aircraft, the liquid measurement system can be utilized in any environment. Further, while fuel will be used herein as exemplar when discussing the liquid in the measurement system, it will be understood that this is merely one example and that other liquids can be contained within the tank. Additionally, this disclosure discusses air as being present in the fuel tank in the space unoccupied by the fuel (i.e., the ullage) and air introduced into the fuel tank to determine the volume of fuel within the fuel tank, but the gas may be another type of gas that is nonreactive with fuel or the liquid that is within the tank.

Figure 1A:
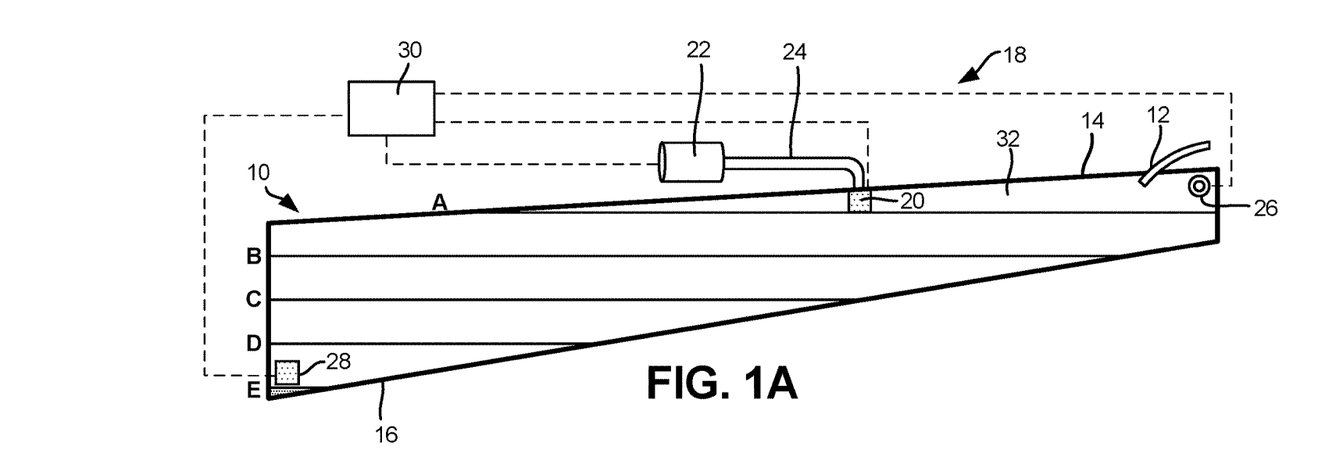
FIG. 1A is a schematic cross-sectional view of a liquid measurement system with a tank having fuel at various levels A-E.
Figure 1B:
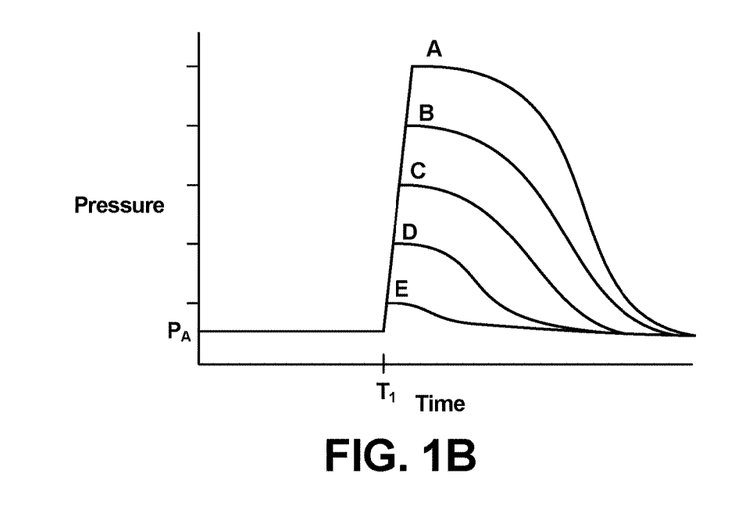
FIG. 1B is a graph of air pressure versus time in the tank with fuel at levels A-E in FIG. 1A.

FIG. 1A is a schematic cross-sectional view of a liquid measurement system with a tank having fuel at various levels A-E, while FIG. 1B is a graph of air pressure versus time in the tank with fuel at levels A-E in FIG. 1A. Tank 10 include vent 12 and has top 14 and bottom 16. Liquid measurement system 18 includes valve 20, pressurized air supply 22, line 24, pressure sensor 26, densitometer 28, and processor 30. Within tank 10, fuel is shown at various levels represented by lines A-E with ullage 32 present above the fuel.

Tank 10 is a container configured to enclose and hold a liquid, such as fuel. Tank 10 can be constructed from a variety of materials, including plastic, metal (such as aluminum), a metal alloy, a composite, or another material. Tank 10 can have any shape suited to fit on/within the environment that tank 10 is in, such as a vehicle. For example, tank 10 in the disclosed embodiment can be a fuel tank that is located within and/or is comprised of the inner skin of a wing of an aircraft so therefore has an irregular, elongated shape. Further, the wing of the aircraft can be angled to be anhedral, flat, or dihedral. In the illustrated embodiment, tank 10 in FIG. 1A has top 14 that is slightly angled to accommodate an inside top of a wing that is dihedral, while bottom 16 of tank 10 is also angled to accommodate an inside bottom of the dihedral wing of the aircraft. Tank 10 is oriented such that a fuselage of the aircraft in which tank 10 is on is to the left of tank 10 in FIG. 1A, and a tip of the wing in which tank 10 is within is to the right of tank 10. In FIG. 1A, bottom 16 has a greater angle than top 14 (i.e., bottom 16 angles upwards from a horizontal plane greater than top 14 angles upwards from a horizontal plane), resulting in tank 10 having an irregular shape that makes measurement of the quantity of fuel within tank 10 using prior art systems difficult. FIG. 1A is an exemplar embodiment, and liquid measurement system 18 can be configured to accommodate any shape, orientation, and size of tank 10 within any shape, orientation, and size of a wing on an aircraft.

Within tank 10 can be fuel or another liquid. As discussed hereinafter, the liquid within tank 10 is referred to as fuel. The quantity of fuel within tank 10 at various levels is represented by lines A-E. Fuel level A is near top 14 of tank 10 and shows tank 10 approximately full. However, even when fuel gauges and other notification equipment would show tank 10 as "full" at fuel level A, tank 10 is not entirely filled with fuel as ullage 32 is present above fuel level A. Ullage 32 is the air/gas present in a volume within tank 10 that is not a volume occupied by fuel. As will be described in greater detail below, vent 12, valve 20, and pressure sensor 26 are located in a location of tank 10 that is most often within ullage 32. Fuel level B shows the quantity of fuel within tank 10 at a level that is less than full but greater than half empty. The volume of ullage 32 at fuel level B is greater than the volume of ullage 32 at fuel level A. Fuel level C shows the quantity of fuel within tank 10 at a level that is less than half full but greater than empty. The volume of ullage 32 at fuel level C is greater than the volume of ullage 32 at fuel levels A and B. Fuel level D shows the quantity of fuel within tank 10 at a level that is less than half full, greater than empty, but less than fuel level C. The volume of ullage 32 at fuel level D is greater than the volume of ullage 32 at fuel levels A, B, and C but less than the volume of ullage 32 at fuel level E. Fuel level E is near bottom 16 of tank 10 and shows tank 10 approximately empty. When fuel is at or below fuel level E, the volume of ullage 32 is approximately equal to the total volume of tank 10. When tank 10 is at fuel level E, densitometer 28 is no longer submerged or only partially submerged in fuel. The relation of fuel levels A-E to the graph in FIG. 1B will be described in detail below.

Vent 12 extends through tank 10 and is configured to allow air or another gas to enter and leave tank 10 to equalize the pressure between tank 10 and the environment. If tank 10 is located on an aircraft or another vehicle, vent 12 may be necessary to ensure a pressure within tank 10 is equal to or close to equal to the environment to prevent tank 10 from collapsing in on itself if the pressure in the environment is greater than the pressure within tank 10 or from expanding and exploding when the pressure within tank 10 is greater than the pressure in the environment. To prevent damage to tank 10, vent 12 ensures the pressure within tank 10 is at an ambient pressure (i.e., at a pressure that is similar to the environment in which tank 10 is located). In FIG. 1A, vent 12 is located at top 14 of tank 10 so that fuel or another liquid within tank 10 cannot flow out of tank 10 when vent 12 is open. Vent 12 can be configured to always be open during operation of the aircraft or can be controlled by an onboard controller or another device that selectively opens and closes vent 12. In other applications, tank 10 does not need to include vent 12, or vent 12 can be configured to allow air or another gas to exit tank 10 into another chamber on/within the vehicle. The chamber could then be evacuated (i.e., pumped and/or pressurized) for use in the next measurement cycle. For example, tank 10 and liquid measurement system 18 could be utilized on a satellite, space capsule, rocket, or any type of thrusters.

Liquid measurement system 18 includes a combination of components that determine the quantity of liquid within tank 10. Disclosed is an exemplar embodiment of liquid measurement system 18 utilized to measure fuel in a fuel tank on an aircraft. However, liquid measurement system 18 can be utilized to measure the quantity of liquid within another container in another environment. As will be described below with regards to FIG. 1B, liquid measurement system 18 determines the quantity of fuel within tank 10 by introducing a known mass of air into tank 10 and measuring the change in air pressure within tank 10. The greater the change in air pressure within tank 10, the smaller the volume of ullage 32 within tank 10 (because the air introduced into tank 10 has less volume to spread out into when the volume of ullage 32 is smaller). Because the volume of fuel within tank 10 is equal to the volume of tank 10 (a known value) minus the volume of ullage 32 (which can be determined by introducing air into tank 10 and measuring the change in pressure), the volume of fuel within tank 10 can be determined. Finally, the known volume of fuel can be combined with a measurement of a density of the fuel to determine the quantity of fuel within tank 10.

Valve 20 extends through tank 10 and is configured to introduce a known mass of air or another gas into tank 10 from pressurized air source 22 through line 24. Valve 20 can extend through tank 10 at any location. Valve 20 in FIG. 1A is located near top 14 of tank 10 so that air is introduced by valve 20 into ullage 32 and fuel cannot flow into line 24. In over embodiments, valve 20 is located hear bottom 16 of tank 10. However, valve 20 and pressure sensor 26 should be located such that pressure sensor 26 gives an accurate reading of the air pressure within ullage 32 and does not give a reading that is too high or low because of the location of valve 20 and pressure sensor 26 with respect to one another. In the disclosed embodiment, valve 20 is at a location such that valve 20 is seldom partially or fully submerged in fuel even when tank 10 is full. Valve 20 should be able to open and close relatively quickly, possibly opening for less than one second at a time. Valve 20 can be any type of valve that is able to be opened to allow a gas to flow through valve 20 and closed to prevent the gas from flowing through valve 20. However, valve 20 should be configured such that the mass of air introduced by valve 20 into tank 10 is able to be determined, such as through valve 20 being an air metering valve, or valve 20 and pressurized air supply 22 being operatively connected to processor 30 such that the pressure of air within air supply 22, the time that valve 20 is open, and the cross-sectional area of valve 20 are known and the mass of air introduced into tank 10 can accordingly be calculated by processor 30. Valve 20, pressurized air supply 22, and/or processor 30 can have other configurations that result in the mass of air introduced by valve 20 into tank 10 being known or easily calculated.

Valve 20 is connected to pressurized air supply 22 by line 24. Pressurized air supply 22 can be a container with a pump that maintains the air within pressurized air supply 22 at a particular pressure, or pressurized air supply 22 can have some other type of configuration. Pressurized air supply 22 can have a sensor that conveys a measurement of pressure to processor 30 so that processor 30 can determine the mass of air introduced into tank 10. Between valve 20 and pressurized air supply 22 is line 24, which conveys air from pressurized air supply 22 to valve 20. Line 20 can be constructed from any material, including rubber, plastic, a composite, or another type of material. Line 20 should be sized with a cross-sectional area that allows little restriction of flow of air between pressurized air supply 22 and valve 20.

Pressure sensor 26 is within tank 10 and is able to measure the air pressure within tank 10 and, in particular, the change in air pressure within tank 10 in response to the introduction of a mass of air into tank 10. Pressure sensor 26 should be of a type that is able to accurately measure rapid changes in the air pressure within tank 10. Pressure sensor 26 should be at a location within tank 10 that allows for quick and accurate measurement of the air pressure within tank 10, so in FIG. 1A pressure sensor 26 is located at top 14 of tank 10 so that pressure sensor 26 is seldom (if ever) partially or entirely submerged within the fuel. Pressure sensor 26 can be operatively connected to processor 30 to convey the air pressure measurement to processor 30 for the determination of the quantity of fuel within tank 10. In FIG. 1A, pressure sensor 26 is shown to be at a location near vent 12, but other configurations can have pressure sensor 26 at another location because pressure sensor 26 does not need to be in close proximity to vent 12.

Densitometer 28 is within tank 10 and is able to measure the density of the liquid within tank 10. Densitometer 28 is located at bottom 16 of tank 10 so that, except when tank 10 is empty, densitometer 28 is partially or entirely submerged within the fuel to be able to measure the density of the fuel. Densitometer 28 can be operatively connected to processor 30 to convey a density measurement to processor 30 for the determination of the quantity of fuel within tank 10. Densitometer 28 is of a type that is able to measure the density of a liquid, but otherwise can be a densitometer that is known in the art. While the disclosed embodiment shows densitometer 28, other configurations of liquid measurement system 18 may not include densitometer 28 as liquid measurement system 18 may be in an environment such that the density of the liquid is not needed and the volume of the liquid within tank 10 is the only value of interest. In such a system, determining the volume of the liquid is sufficient, such as determining the volume of water in a water tank. With fuel, it may be necessary to known the density of the fuel, as the energy stored within the fuel is dependent upon the density of the fuel. With the quantity of the fuel within tank 10 reflecting the fuel's energy capabilities and being dependent upon the volume of fuel within tank 10 and density of the fuel, densitometer 28 is needed to determine the density of fuel within tank 10.

Processor 30 is a computing device or another device that can be operatively connected to valve 20, pressurized air supply 22, pressure sensor 26, and/or densitometer 28. Processor 30 is able to receive measurement data and other information from the other components of liquid measurement system 18 and determine the quantity of fuel within tank 10. Processor 30 can be at a location that is relatively close to tank 10, or processor 30 can be remote from tank 10, such as adjacent to or within an on-board computer of an aircraft. Processor 30 can be operatively connected to valve 20 and pressure sensor 26 to determine the volume of liquid, such as fuel, within tank 10 from knowing the mass of air introduced by valve 20 into tank 10 and from knowing the change in air pressure within tank 10 as measured by pressure sensor 26. Further, processor 30 can be configured to determine the mass of air introduced into tank 10 by valve 20 by also being operatively connected to pressurized air supply 22, with the mass of air introduced into tank 10 being dependent upon the cross-sectional area of valve 20, the duration of time valve 20 is open, and the air pressure within pressurized air supply 22. Processor 30 can be operatively connected to densitometer 30 to determine the quantity of fuel within tank 10, which is dependent upon the density of the fuel and the volume of the fuel within tank 10. Finally, processor 30 can be operatively connected to a fuel gauge or other notification equipment to inform an operator of the quantity of fuel within tank 10.

The quantity of fuel within tank 10 depends upon the density of the fuel as measured by densitometer 28 and the volume of the fuel, which can be determined through the use of the other components of liquid measurement system 18. The volume of fuel within tank 10 is equal to the total volume of tank 10 minus the volume of ullage 32 as shown below:

$$V_{fuel} = V_{tank} - V_{ullage}$$

In the equation above, the volume of tank 10 is known and is constant as tank 10 is substantially rigid. Thus, determining the volume of ullage 32 allows for a simple calculation of the volume of fuel within tank 10.

The volume of ullage 32 can be determined by using the equation shown below:

$$V_{ullage} = \frac{(F_{in} - F_{out}) \cdot R \cdot T_{air}}{\Delta P}$$

In the equation above regarding the volume of ullage 32, $F_{in}$ is the flow rate of air into tank 10 from pressurized air supply 22 in the form of moles of air over time with time being the duration that valve 20 is open. $F_{in}$ is the flow rate of air out of tank 10 through vent 12 in the form of moles of air over time with time being the duration that valve 20 is open. If tank 10 does not include vent 12, than $F_{out}$ is zero. R is the molar gas constant, while $T_{air}$ is the measured temperature of the air. Finally, $\Delta P$ being the change in air pressure of ullage 32, which is the measurement of the peak air pressure following the introduction of the mass of air into tank 10 minus the ambient air pressure within tank 10 prior to the introduction of the mass of air.

If tank 10 includes vent 12 that is always open or is open during the time when valve 20 is open to introduce a mass of air into tank 10, then the flow rate of air out of tank 10 through vent 12, $F_{out}$, can be determined by the following equation:

$$F_{out} = \frac{k \cdot \frac{\pi D}{4} \cdot C_d \cdot \sqrt{P_{ambient} \cdot (P_{peak} - P_{ambient})}}{T_{air}}$$

In the equation above regarding the flow rate of air out of tank 10 through vent 12, k is a constant that is determined through calibration of liquid measurement system 18. In the disclosed embodiment, k is 0.5889. D is the diameter of vent 12 in inches. However, the flow rate of air out of tank 10 through vent 12 can be determined if vent 12 is not circular. $C_d$ is the flow coefficient, which is dependent upon a variety of factors, such as vent geometry, piping length, and other characteristics of vent 12. $P_{ambient}$ is the ambient pressure within tank 10 prior to the introduction of the mass of air, $P_{peak}$ is the peak air pressure following the introduction of the mass of air into tank 10, and $T_{air}$ is the measured temperature of the air.

Through the use of the above equations, liquid measurement system 18 can determine the volume of fuel within tank 10, which can then be used to calculate the quantity of fuel within tank 10. The calculations and use of the above equations can be done by processor 30, which can be a computing device including a processor and memory storage device. As shown in FIG. 1B, the decrease in air pressure from peak air pressure to ambient air pressure is exponential. Because liquid measurement system 18 uses the principle that the air pressure within tank 10 changes in response to the introduction of the known mass of air through valve 20, other means for determining the volume of fuel within tank 10 can be utilized. For example, the volume of fuel within tank 10 can be determining using the duration of time tank 10 takes to return to ambient pressure after the introduction of air into tank 10. Also, the duration of time between the time valve 20 introduces air into tank 10 until the time of peak air pressure can be used to determine the volume of fuel within tank 10. Further, a machine learning/pattern recognition algorithm can be used, such as through the use of a neural network. These and other methods can be used to determine the volume (and, therefore, quantity) of fuel within tank 10 based upon the response of the system to the introduction of air into tank 10.

The quantity of fuel within tank 10 can be determined multiple times in relatively quick succession as the quantity of fuel changes so that an operator has continuous knowledge of the quantity of fuel within tank 10. To begin the process of determining the quantity of fuel within tank 10, valve 20 introduces a known mass of air into tank 10. As discussed above, the mass can be known from valve 20 being an air metering valve; from processor 30 calculating the mass from measurements of the air pressure of pressurized air supply 22, the cross-sectional area of valve 20, and the duration of time valve 20 is open; or from another way of determining the mass of air introduced by valve 20. Valve 20 can be open only a short duration of time to allow air into tank 10 so that the cycle of determining the quantity of fuel within tank 10 can be repeated often within a small duration of time. Further, valve 20 can be open only a short duration of time to prevent an increase in pressure within tank 10 that is so high that it can cause damage to tank 10.

After the introduction of air through valve 20, the change in air pressure within the volume of ullage 32 in response to the introduction of the known mass of air is measured by pressure sensor 26. This change in air pressure can be determined by measuring the air pressure before the introduction of air and then measuring the air pressure soon after the introduction of air. If vent 12 is continuously open throughout the entire process such that air is always allowed to leave tank 10, then the measurement of the air pressure by pressure sensor 26 will occur immediately after the introduction of the known mass of air before a large mass of air flows out vent 12 and leaves tank 10.

After measuring the change in air pressure within tank 10, processor 30 determines the volume of fuel within tank 10 from the measurement of the change in air pressure. In the disclosed embodiment, the volume of fuel within tank 10 is calculated from determining the volume of ullage 32 in tank 10. The volume of ullage 32 is determined from knowing the mass of air introduced and measuring the change in pressure as a result of the introduction of that mass of air into tank 10. Determining the volume of ullage 32 assumes that the fuel within tank 10 is substantially incompressible, which is a proper assumption during all ranges of operating conditions of tank 10 in the embodiment described herein. Other embodiments may, instead of assuming the liquid within tank 10 is incompressible, incorporate a measurement of the density of the liquid before and after the introduction of a mass of air into tank 10 to determine the compression of the liquid in tank 10 and the volume of ullage 32. After determining the volume of ullage 32, the volume of fuel within tank 10 is then determined from the volume of tank 10 (which is constant) and the volume of ullage 32 (which was just calculated).

Throughout the process, densitometer 32 can be measuring the density of the fuel and relaying that information to processor 30. The quantity of fuel within tank 10 can then be calculated from the known volume of fuel and the density of the fuel. This data can be relayed to a fuel gauge or other notification equipment to inform the operator of the quantity of fuel within tank 10. When only the volume of the liquid within tank 10 is needed, densitometer 23 is not necessary and the steps of determining the density of the fuel/liquid and calculating the quantity of fuel/liquid from the determination of the volume of the fuel/liquid and the density of the fuel/liquid are not needed.

Vent 12 can be open throughout the process, so the change in air pressure within tank 10 as a result of the introduction of a mass of air by valve 20 should be measured close in time before and after the introduction of the mass of air. Other embodiments of liquid measurement system 10 can include a system that does not include vent 12 (with air allowed to leave tank 10 through valve 20 or another way), or includes vent 12 that is closed during the introduction of the mass of air and during measurement of the change in air pressure and then opened after to allow the air pressure within tank 10 to return to an ambient pressure. In the disclosed embodiment, vent 12 is continuously open, which allows the air pressure within tank 10 to begin to return to an ambient pressure immediately after the introduction of the mass of air into tank 10.

After determining the quantity of fuel within tank 10 (or, if quantity is not necessary, the volume of fuel/liquid within tank 10), the process can be performed repeatedly to determine the quantity/volume of fuel within tank 10 at subsequent points in time. However, it may be necessary to allow the air pressure within tank 10 to return to an ambient pressure or close to an ambient pressure before introducing a second, third, fourth, etc. known mass of air into tank 10. With the quantity of fuel being determining at numerous points in time throughout the operation of the aircraft, the operator is continuously informed of the quantity of fuel within tank 10.

FIG. 1B is a graph depicting the pressure measured by pressure sensor 26 versus time, with the pressure measured when the fuel is various fuel levels A-E. In FIG. 1B, it is assumed that the pressure within tank 10 is at ambient pressure $P_A$ before the introduction of the mass of air for each determination of the quantity of fuel at fuel levels A-E. Further, it is assumed that vent 12 is continuously open, which allows the air to flow out of tank 10 and eventually return the air within tank 10 to ambient pressure $P_A$. Finally, it is assumed that the mass of air introduced through valve 20 is the same during each fuel quantity/volume measurement occurrence, and the introduction of this mass of air occurs at time $T_1$. However, in other situations and/or embodiments, the mass of air introduced through valve 20 may not be the same each time.

When the volume of fuel within tank 10 is at fuel level A, the volume of ullage 32 is relatively small, resulting in the mass of air added to tank 10 through valve 20 having a smaller volume to disperse into, causing the change in air pressure within tank 10 to be greater. Thus, when tank 10 is full with fuel, the change in air pressure is the largest as compared to the other fuel levels as seen by plot A in FIG. 1A. With the change in air pressure being the largest at fuel level A, vent 12 will take longer to return the air pressure within tank 10 to ambient pressure $P_A$. After calibration of liquid measurement system 18 (to account for the mass of air introduced, the volume of tank 10, etc.), processor 30 can determine that tank 10 is close to full with fuel being at fuel level A.

Fuel level B shows the volume of fuel within tank 10 at a level that is less than full but greater than half empty. At fuel level B, the volume of ullage 32 is larger than that at fuel level A so the mass of air added to tank 10 through valve 20 has a larger volume to disperse into, causing the change in air pressure within tank 10 when the fuel is at level B to be less than the change in air pressure at fuel level A. Thus, the plot of the air pressure within tank 10 versus time of fuel level B in FIG. 1B includes a change in air pressure (i.e., the jump at time $T_1$) that is less than that of fuel level A.

Fuel level C shows the volume of fuel within tank 10 at a level that is approximately less than half full but greater than empty. At fuel level C, the volume of ullage 32 is larger than that at fuel level B (but less than that at fuel level D) so the mass of air added to tank 10 through valve 20 has a larger volume to disperse into than when at fuel level B but a smaller volume than when at fuel level D. This causes the change in air pressure within tank 10 when the fuel is at level C to be less than the change in air pressure at fuel level B. Thus, the plot of the air pressure within tank 10 versus time of fuel level C in FIG. 1B includes a change in air pressure (i.e., the jump at time $T_1$) that is less than that of fuel level B but more than that of fuel level D.

Fuel level D shows the volume of fuel within tank 10 at a level that is less than half full, greater than empty, but less than fuel level C. At fuel level D, the volume of ullage 32 is larger than that at fuel level C (but less than that at fuel level E) so the mass of air added to tank 10 through valve 20 has a larger volume to disperse into than when at fuel level C but a smaller volume than when at fuel level E. This causes the change in air pressure within tank 10 when the fuel is at level D to be less than the change in air pressure at fuel level C. Thus, the plot of the air pressure within tank 10 versus time of fuel level D in FIG. 1B includes a change in air pressure (i.e., the jump at time $T_1$) that is less than that of fuel level C but more than that of fuel level E.

Fuel level E shows the volume of fuel within tank 10 at approximately zero (i.e., tank 10 is empty of fuel). At fuel level E, the volume of ullage 32 is approximately at its greatest such that the entire tank 10 is filled with ullage 32 so the mass of air added to tank 10 through valve 20 has the largest volume to disperse into than when at the other fuel levels. This causes the change in air pressure within tank 10 when at fuel level E to be the least. Thus, the plot of air pressure within tank 10 versus time of fuel level E includes a change in air pressure (i.e., the small jump at time $T_1$) that is less than that at the other fuel levels. With the change in air pressure being the smallest at fuel level E, vent 12 will take the shortest amount of time to return the air pressure within tank 10 to ambient pressure $P_A$.

As compared to other systems that measure the quantity of a liquid within a container, liquid measurement system 18 requires very few components: valve 20, pressurized air supply 22, one pressure sensor 26, one densitometer 28, and processor 30. And the components of liquid measurement system 18 do not require electrical storage, which may be prohibited by aviation regulations and can increase the risk of ignition of fuel within tank 10. Thus, liquid measurement system 18 provides a simple and safe system for determining the quantity of liquid within a tank. Liquid measurement system 18 determines the quantity of fuel within tank 10 by introducing a known mass of air into tank 10 and measuring the change in air pressure within tank 10. The greater the change in air pressure within tank 10, the smaller the volume of ullage 32 within tank 10 (because the air introduced into tank 10 has less volume to spread out into when the volume of ullage 32 is smaller). Because the volume of fuel within tank 10 is equal to the volume of tank 10 (a known value) minus the volume of ullage 32 (which can be determined by introducing air into tank 10 and measuring the change in pressure), the volume of fuel within tank 10 can be determined. Finally, the known volume of fuel can be combined with a measurement of a density of the fuel to determine the quantity of fuel within tank 10.

Discussion of Possible Embodiments

The following are non-exclusive descriptions of possible embodiments of the present invention.

A liquid measurement system for determining a quantity of a liquid within a tank includes a pressurized air supply, a valve connected to the pressurized air supply with the valve able to introduce a known mass of air into the tank, a pressure sensor able to measure the change in air pressure within the tank, and a processor operatively connected to the valve and the pressure sensor. The processor is able to determine the volume of the liquid within the tank from the known mass of air introduced into the tank and the change in air pressure within the tank.

The liquid measurement system of the preceding paragraph can optionally include, additionally and/or alternatively, any one or more of the following features, configurations, and/or additional components:

The pressure sensor is positioned at a top of the tank.

The valve is positioned at a top of the tank.

The valve is an air metering valve.

The processor is operatively connected to the valve and determines the known mass of air introduced into the tank by knowing a pressure of the air at the pressurized air supply and knowing an amount of time the valve is open to allow air to enter the tank.

A densitometer able to measure the density of the liquid within the tank.

The densitometer is positioned at a bottom of the tank.

The liquid is fuel.

A vent in the tank able to allow air to leave the tank.

A method of measuring a liquid in a tank includes introducing a first known mass of air into the tank, measuring a change in air pressure within the tank in response to the introduction of the first known mass of air, and determining the volume of the liquid within the tank depending on the change in air pressure within the tank.

The method of the preceding paragraph can optionally include, additionally and/or alternatively, any one or more of the following features, configurations, steps, and/or additional components:

Measuring the density of the liquid within the tank and determining the quantity of the liquid within the tank depending on the change in air pressure and the density of liquid within the tank.

Venting air out of the tank.

Introducing a second known mass of air into the tank, measuring the change in air pressure within the tank in response to the introduction of the second known mass of air, and determining the volume of liquid within the tank depending on the change in air pressure within the tank in response to the introduction of the second known mass of air.

The second known mass of air is different from the first known mass of air.

The conveying a value for the quantity of liquid within the tank to a liquid level gauge.

The step of introducing the first known mass of air into the tank further includes measuring a pressure of air at a pressurized air supply, opening a valve in the tank for a known period of time to introduce a mass of air into the tank, and determining the first known mass of air.

An aircraft includes a fuel tank in a wing of the aircraft, a pressurized air supply, a valve connected to the pressurized air supply with the valve configured to allow a known mass of air into the fuel tank, a vent in the tank configured to allow air to leave the fuel tank, a densitometer configured to measure a density of fuel within the fuel tank, a pressure sensor configured to measure a change in pressure of the air within the fuel tank in response to the addition of the known mass of air, and a processor operatively connected to the valve, the densitometer, and the pressure sensor. The processor is configured to determine a quantity of fuel within the fuel tank from the known mass of air added to the fuel tank, the change in pressure of the air within the fuel tank, and the density of fuel within the fuel tank.

The aircraft of the preceding paragraph can optionally include, additionally and/or alternatively, any one or more of the following features, configurations and/or additional components:

The processor determines the known mass of air added to the tank by knowing a pressure of the air at the pressurized air supply and knowing an amount of time the valve is open to allow air to enter the fuel tank.

The vent allows the air within the tank to leave the tank after the process determines the quantity of fuel within the fuel tank to return the air pressure within the fuel tank to an ambient air pressure.

The valve introduces the known mass of air into the fuel tank multiple times during operation of the aircraft, the pressure sensor measures the change in pressure of the air within the fuel tank in response to the addition of each known mass of air, and the quantity of fuel within the tank is determined after each addition of the known mass of air.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A liquid measurement system for determining a quantity of a liquid within a tank, the system comprising:
   a pressurized air supply;
   a valve connected to the pressurized air supply, the valve configured to introduce a known mass of air into the tank;
   a two-way vent in the tank configured to allow air to leave the tank continually during and after the introduction of the known mass of air to return an air pressure within the tank to an ambient air pressure;
   a pressure sensor able to measure a change in air pressure within the tank resulting from the introduction of the known mass of air into the tank; and
   a processor operatively connected to the valve and the pressure sensor, the processor able to determine the volume of the liquid within the tank from the change in air pressure within the tank, the known mass of air introduced into the tank, and a time from the introduction of air until the air pressure within the tank returns to ambient pressure.

2. The system of claim 1, wherein the pressure sensor is positioned at a top of the tank.

3. The system of claim 1, wherein the valve is positioned at a top of the tank.

4. The system of claim 1, wherein the valve is an air metering valve.

5. The system of claim 1, further comprising:
   a densitometer able to measure the density of the liquid within the tank.

6. The system of claim 5, wherein the densitometer is positioned at a bottom of the tank.

7. The system of claim 1, wherein the liquid is fuel.

8. A method of measuring a liquid in a tank, the method comprising:
   introducing a known mass of air into the tank;
   venting air out of the tank continually during and after the introduction of air into the tank to return an air pressure within the tank to an ambient pressure;
   measuring a change in air pressure within the tank in response to the introduction of the known mass of air into the tank;
   measuring a time from the introduction of air until the air pressure within the tank returns to ambient pressure; and
   determining a volume of the liquid within the tank depending on the change in air pressure within the tank, the known mass of air introduced into the tank, and the time from the introduction of air until the air pressure within the tank returns to ambient pressure.

9. The method of claim 8, further comprising:
   measuring the density of the liquid within the tank; and
   determining the quantity of the liquid within the tank depending on the change in air pressure, the amount of time that passes between the first time and the second time, and the density of liquid within the tank.

10. The method of claim 8, further comprising:
    conveying a value for the volume of liquid within the tank to a liquid level gauge.

11. An aircraft comprising:
    a fuel tank in a wing of the aircraft;
    a pressurized air supply;
    a valve connected to the pressurized air supply, the valve configured to introduce a known mass of air into the fuel tank;
    a two-way vent in the fuel tank configured to allow air to leave the fuel tank continually during and after the introduction of the known mass of air to return an air pressure within the fuel tank to an ambient pressure;
    a densitometer configured to measure a density of fuel within the fuel tank;
    a pressure sensor configured to measure a change in air pressure within the fuel tank resulting from the introduction of the known mass of air into the fuel tank; and
    a processor operatively connected to the valve, the densitometer, and the pressure sensor and configured to determine a quantity of fuel within the fuel tank from a change in pressure of the air within the fuel tank, the known mass of air introduced into the fuel tank, a time from the introduction of air until the air pressure within the fuel tank returns to ambient pressure, and the density of fuel within the fuel tank.

* * * * *

UNITED STATES PATENT AND TRADEMARK OFFICE
CERTIFICATE OF CORRECTION

PATENT NO. : 10,442,545 B2
APPLICATION NO. : 15/490606
DATED : October 15, 2019
INVENTOR(S) : David H. Crowne and Charles Jeff Allred It is certified that error appears in the above-identified patent and that said Letters Patent is hereby corrected as shown below:

Column 6, Line 31:
Delete "Fin"
Insert --Fout--

Signed and Sealed this
Twenty-first Day of January, 2020

Andrei Iancu
*Director of the United States Patent and Trademark Office*